United States Patent [19]

el Din Nasser

[11] Patent Number: 4,624,747

[45] Date of Patent: Nov. 25, 1986

[54] PROCESS FOR THE DISTILLATION OF FRESH WATER FROM SEA WATER

[75] Inventor: Gamal el Din Nasser, Puchheim, Fed. Rep. of Germany

[73] Assignee: D.V.T. Büro für Anwendung Deutscher Verfahrenstechnik H. Morsy, Dusseldorf, Fed. Rep. of Germany

[21] Appl. No.: 786,167

[22] Filed: Oct. 9, 1985

Related U.S. Application Data

[63] Continuation of Ser. No. 496,709, May 20, 1983.

[30] Foreign Application Priority Data

May 24, 1982 [DE] Fed. Rep. of Germany ....... 3219386
Oct. 27, 1982 [DE] Fed. Rep. of Germany ....... 3239816

[51] Int. Cl.$^4$ ............................ C02F 1/06; B01D 3/06
[52] U.S. Cl. ...................................... 203/11; 203/22; 203/25; 203/40; 203/72; 203/75; 203/77; 203/88; 159/18; 159/49; 159/DIG. 8; 159/DIG. 22; 202/173; 202/174; 202/176; 202/180; 202/182; 202/197; 202/202
[58] Field of Search ............... 202/174, 173, 236, 237, 202/205, 177, 176, 180, 202, 197; 203/10, 11, 72, 87, 88, 22, 40, 75, 25, 77, 89; 159/18, 20 R, 20.1, 27 B, 27.3, 13 A, 13.2, 49, DIG. 22, DIG. 8

[56] References Cited

U.S. PATENT DOCUMENTS

| | | | |
|---|---|---|---|
| 3,214,350 | 10/1965 | Lichtenstein | 202/236 X |
| 3,303,106 | 2/1967 | Standiford | 159/18 X |
| 3,351,120 | 11/1967 | Goeldner et al. | 159/13 B |
| 3,494,836 | 2/1970 | Standiford | 202/174 |
| 3,816,266 | 6/1974 | Izumi et al. | 202/173 |
| 3,824,154 | 7/1974 | Takada et al. | 159/18 |
| 3,824,155 | 7/1974 | Takada | 159/18 |
| 3,839,160 | 10/1974 | Izumi | 202/173 |
| 3,961,658 | 6/1976 | Pagani | 202/174 |

FOREIGN PATENT DOCUMENTS

2334481 1/1974 Fed. Rep. of Germany.

Primary Examiner—Wilbur Bascomb
Attorney, Agent, or Firm—Toren, McGeady, Stanger, Goldberg & Kiel

[57] ABSTRACT

In the distillation of fresh water from sea water, the sea water is passed downwardly in a falling film evaporator through a multiplicity of vertical tube evaporator (VTE) stages and multiple stage flash (MSF) evaporators. After the sea water passes through the first VTE stage where it forms a liquid component and a steam component, the liquid component is distributed evenly into the next VTE stage while the steam component enters an adjoining MSF stage. Condensed fresh water flows downwardly from one MSF stage to the next and experiences flash evaporation. The sea water or brine component and the fresh water distillate flow downwardly through the VTE and MSF stages so that the brine component can be removed from the final VTE stage and the fresh water distillate from the final MSF stage. The steam used to evaporate the sea water flows initially through the first VTE stage and then in combination with the steam component of the sea water through the next MSF stage and then continues alternately through the remaining VTE and MSF stages. Inert gases produced during the stagewise evaporation are removed periodically by suction. In the lower or low pressure VTE stages, for each VTE stage the condensed fresh water distillate is flashed in a plurality of MSF stages. The sea water is preheated before it is introduced into the first VTE stage and the primary steam used for heating the sea water and the steam component of the sea water are passed through the preheater for heating the sea water. The preheater and the VTE stages of the falling film evaporator are formed of stamped heat exchanger parts.

5 Claims, 6 Drawing Figures

PROCESS FOR THE DISTILLATION OF FRESH WATER FROM SEA WATER

This is a continuation of application Ser. No. 496,709 filed May 20, 1983 and now abandoned.

SUMMARY OF THE INVENTION

The present invention is directed to a process of and apparatus for distilling fresh water from sea water by film evaporation in a multi-stage vertical tube evaporation (VTE) process. In the VTE process the sea water, to be evaporated, is passed through tu,bular heat exchangers heated by primary vapor or steam.

As disclosed in German Pat. No. 23 34 481, sea water, heated in a preheater constructed as a stage heater, successively passes through the individual stages of a falling film evaporator which is heated in the first stage only with primary steam and operates in the range of the maximum water boiling point. Partial evaporation of the sea water takes place in the individual stages, while the unevaporated or liquid component of the sea water flows into the next stage which is heated with a mixture of steam components. After passing through the final stage, the sea water has been separated into brine and distillate characterized as clean or fresh water. The preheater and falling film evaporator are separated into equal pressure and temperature stages, in accordance with the boiling point reduction which can be obtained in each stage and also in the form of tubular heat exchangers arranged as vertical columns within a support structure.

Such tubular evaporators are made up of densely packed tube bundles arranged between flanges and the arrangement has a relatively high mechanical strength, particularly in the tube direction. As a result, the container enclosing the heat exchangers contains only the supporting grates associated with the individual evaporating stages on which the two bundles are supported by means of their flanges. Such columns, which generally have less than 15 stages, as a consequence, have an adequate mechanical strength so that there is no need to provide special supporting frames within the containers surrounding the tubular bundles Since tubular heat exchangers have an economic length of approximately 7 m, the number of stages with a temperature difference of approximately $+120°$ C. available for stage evaporation, though only 15 stages are employed, have an overall height of the evaporation column is more than 100 m. The efficiency in a multi-effect evaporation process, however, is dependent on the number of evaporation stages which can be obtained within the pressure difference between the first and final stage of the evaporator available for sea water evaporation.

Consequently, there is a need to increase significantly the number of stages in such columns, but such an increase can not be obtained, for a number of reasons, with tubular exchangers. This problem can be overcome by the use of stamped exchanger plates which have reinforcing projections and depressions arranged in a uniform manner and in a grid-like form in the two directions of the plates. The plates are arranged in pairs in a mirror-symmetrical manner so that the projections-depressions oriented in one direction form tube-like ducts and those oriented in the other direction defines slot-like ducts on the opposite sides of the plates. Accordingly, depending on whether the exchanger plates are used in a preheater or a falling film evaporator, the steam flows through either the tube-like ducts or the slot-like ducts and the sea waterflows through either the slot-like ducts or the tube-like ducts. Such identical heat exchanger plates form a type of fillter within a vertical column, and, as a result, are requred in large numbers, especially if more than 50 stages are required for performing the multi-effect evaporation process. Accordingly, gratings held by the container wall enclosing the het exchanger plates are no longer sufficient for a predetermined arrangement of such a large number of such plats within a pressure container for maintaining the desired arrangement of the individual heat exchanger plates. Therefore, a need is present for a support structure for a pressure-tight container which is particularly suitable for this purpose. Furthermore, when desalinating sea water by the multi-effect evaporation process, it is unavoidable that gases, particularly inert gases, collect in the individual stages of the falling film evaporator and such gases must be removed by suction so as not to impair the condensation process. This requirement causes considerable problems in the case of tubular exchangers, because ther is either a precise condensation end of the stage, nor any possibility of suction removal at such an end, due to th spatial arrngement of the individual tubes in bundles.

Moreover, it is difficult in the case of tubular exchangers to distribute uniformly the sea water to be evaporated onto the surfaces of the inner walls of the tubes held by the flanges in each stage. Only with the uniform distribution of the sea water at the beginning or inlet of each stage is it possible to obtain the desired homogeneous liquid films, flowing on the inner circumferential surfaces of the tubes, and which are necessary for effective evaporation. Such liquid films, however, cannot be maintained over tube lengths of approximately 7 m.

Finally, considerable difficulties are encountered in connection with the assembly and maintenance of such columns constructed as tubular exchangers. As residues are unavoidable in evaporation processes for producing fresh water from sea water, maintenance costs, apart from energy costs, considerably influence the balance of costs.

In a multiple stage flash evaporation (MSF) process the heated sea water to be evaporated flows through numerous flash chambers with weirs and passages in the lower parts of such chambers. Preheater tubes are located in the upper parts of the flash chambers through which the incoming sea water is heated and on which the steam generated from the sea water is condensed. The fresh water distillate and the brine concentrate can be removed from the final flash chamber, note Ullmann, "Enzyklopëdie der Chemie", 3rd edition, vol. 18, p. 465.

The efficiency in such an arrangement is dependent on the number of evaporation stages which can be obtained within the temperature difference between the first and final stages available for the evaporation of the sea water. Admittedly, the horizontally oriented cellular construction in MSF process plants permits a larger number of stages than in VTE process plants, up to the present time 36 stages have been obtained, however, in flash evaporation more than 60% of the total costs are involved in the actual evaporation of the sea water, so that such plants have not been successfully comparable with so-called falling film evaporators, which have a significantly higher evaporation efficiency. In addition, plants operating on the basis of the MSF process require considerably more space than the vertically constructed plants for falling film evaporators of the VTE process.

The primary object of the present invention is to provide a novel process and apparatus for distilling fresh water from sea water so that the fresh water yield per energy unit consumed is improved in a significant manner. Further, another object is to provide a supporting frame for the evaporation column located within a pressure-tight container, particularly for desalinating sea water by the multi-effect evaporation process. The supporting frame not only fulfills the necessary supporting function, but simultaneously is constructed so that a stage separation and a permanent maintenance of the geometrical arrangement of the individual and identical heat exchanger plates is possible, without special precautions or additional components required on the heat exchanger plates.

On the basis of a process for the distillation of fresh water from sea water by film evaporation in a multiple stage VTE process, in accordance with the present invention, after the sea water passes through the first VTE process stage and before the liquid component of the sea water enters the following VTE stages, the liquid component is distributed over a weir-like member and condensed fresh water passing into at least one MSF process stage associated with an individual VTE stage undergoes flash evaporation as it passes from one MSF stage to the next. The fresh water distillate and the increasingly concentrated liquid sea water component or brine are passed downwardly through the following VTE process and MSF process stages so that the brine concentrate can be removed from the final VTE process stage and the fresh water distillate from the final MSF stage. The steam for heating and evaporating the sea water is successively passed through all of the evaporation stages starting with the first VTE process stage and subsequently is mixed with the steam components from the evaporated sea water from the subsequent VTE process stages. The inert gases separated during the stagewise evaporation are removed by suction.

In accordance with the present invention, an apparatus for carrying out the multi-effect evaporation process utilizes heat exchanger plates for the preheater and for the falling film evaporator. The arrangement of heat exchanger plates is located within and between the facing side walls of a pressuretight container located within a supporting frame. Bearing surfaces are provided within the container corresponding to the number of slide-in units in the stages of the falling film evaporator. The preheater is positioned within the container extending over the height of the VTE stages. Deflectors are provided within the container for each of the pressure stages, corresponding to the number of slide-in units, so that each of the stages is provided in a pressure-tight manner with each stage of the falling film evaporator corresponding to a similar pressure stage of the preheater.

Further features of the invention are set forth in the claims.

By the combination, in accordance with the present invention, of the two known evaporation processes to form a single evaporation process, it is possible to utilize not only the evaporation energy supplied in an optimum manner, but it is also possible to provide an extremely simple construction of the evaporation units if stamped, flat heat exchanger plates are used both for the preheater and the falling film evaporator permitting the establishment of a large random number of stages for utilizing an available temperature and pressure gradient and a simple construction in a common vertically extending pressure-tight container. The MSF process stages interposed between the VTE stages and the preheater stages can be formed as curved deflectors or baffles which simultaneously serve as the defining boundaries for the pressure chambers of different pressure levels. Accordingly, the vertically arranged preheater housed in the same pressure-type container, has its heating surfaces connected directly to the steam components in the individual VTE and MSF process stages.

In the uppermost or first VTE process stage, the sea water, heated to approximately 130° C. in the preheater, is evaporated by indirect contact with a supply of primary steam at 130° C. The primary steam condensate from the first VTE stage is introduced into the distillation process in the first MSF process stage which is in direct flow communication with the first VTE stage. The fresh water distillate collected in the MSF stages flows downwardly to the last or lowermost stage and then passes out of the pressure-tight container at a temperature of approximately 28.9° C. The liquid sea water component, or brine, flowing from the outlet of the first VTE process stage is dammed up by a weir-like member at the inlet to the next VTE process stage. The weir-like or distribution member provides a liquid level at the entrance to the VTE process stage. Due to an overflow and a restrictor, a part of the liquid sea water component or brine passes directly into the adjoining MSF stage which has a lower pressure than the preceding stage so that flash evaporation takes place. The main portion of the liquid sea water component or brine flows about the distributor member into the VTE process stage. As a result of the pressure reduction and heat transfer through the condensing distillate steam from the preceding process stage, a portion of the brine flowing through the VTE stage evaporates. At the outlet from the VTE process stage the vaporized sea water separates from the liquid component of the sea water and flows into the corresponding MSF stage while the sea water liquid component again collects at the inlet of the following VTE process stage for continuing the evaporation process. These process steps are repeated at modified saturated steam temperatures and pressures until all of the VTE process stages have been traversed by the sea water liquid component or brine which has an increasing salt concentration. The steam generated in the falling film evaporator is passed through deflectors located at the opposite ends of the individual VTE stages and the deflectors act as centrifugal drip separators for the liquid and steam components of the flow entering the corresponding MSF stage. The steam generated in the VTE stage is condensed on the heat exchanger surfaces in the corresponding pressure stage of the preheater. The condensate is also collected in the deflectors and is supplied via restrictors to the next lower pressure level of the MSF stages in the column so that at least a part of the fresh water distillate is flashed as it enters the following MSF stage whereby it flows through the corresponding VTE stage for transferring heat to and evaporating the down-flowing liquid component of sea water.

In a multi-effect evaporator process where there are more than 43 process stages in the operating column, in the upper 43 process stages the steam component from each VTE process stage is directly mixed with the components in the corresponding MSF stage as described above. If there are a total of 55 VTE process stages in the operating column, in the last or lower 12 process stages, the fresh water distillate in each stage is flashed in a plurality of corresponding MSF stages. The steam produced in these lower MSF process stages is condensed only on the tubular heat exchanger surfaces of the corresponding stages of the preheater.

The condensates collecting in the deflectors or baffles constructed as centrifugal drip separators is supplied to the following process stage by restrictors restricted in accordance with the pressure differences. The individual stages are sealed from one another for maintaining the pressure differences. The inert gases separated out within the column for each flash process and condensation are removed by suction at two points from each process stage with the suctioning action taking place at the end points in the condensation process. Inert gases obtained in the VTE process stages are removed by suction to a cavity between the deflectors and the wall of the container along, in each case, the lowermost gap cross-section in each VTE process stage, and specifically in each stage at the center between the opposite ends of the heat exchanger surfaces. The inert gases contained in the condensation process in the preheater are also removed by suction through corresponding openings in a wall of the container via a suitable cavity between the preheater and the wall at the condensation end point. The inert gas suction capacities for the individual stages are, in each case, regulated by throttle valves in the individual connecting lines.

The process according to the invention makes it possible to more than double the efficiency and, as a result, the output as compared with known processes.

In the present invention, the pressure-tight container affords a supporting frame for the evaporation column and a particularly simple and cost-saving construction is obtained, without any reduction in operational reliability. The container is constructed of fixed and movable side walls with corresponding deflectors for forming the individual stages so that the installation and maintenance of the column is facilitated to a considerable extent. After removing the movable side walls of the container, it is merely necessary to detach one deflector stage so that a slide-in unit forming one of the stages can be removed. Accordingly, the time-consuming and costly detachment of connections experienced in the past is rendered completely superfluous.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
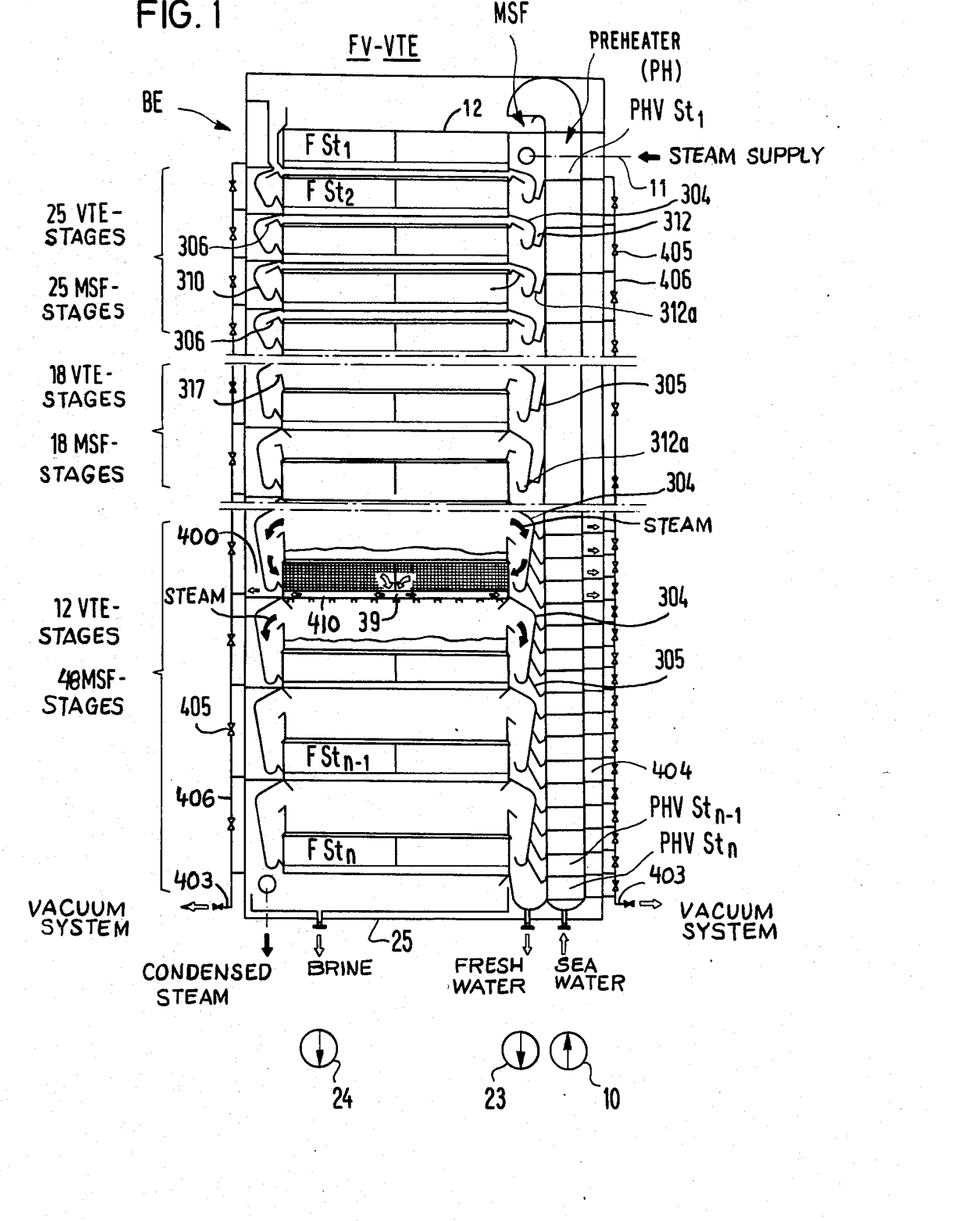
FIG. 1 is a process diagram of the sea water desalination apparatus embodying the present invention illustrating certain of the initial stages, several of the intermediate stages and several of the final stages of the apparatus.

As shown in the process diagram of FIG. 1, cold sea water is supplied by a pump 10 into the lower end of a vertical sea water preheater PH made up of a number of stages, that is stages $PHSt_n$ to $PHSt_1$ where the sea water is heated with condensing steam. After its upward path through the preheater, the heated sea water is evaporated in a vertical falling film evaporator FV also made up of a plurality of stages, that is, stages $FSt_1$ to $FSt_n$ with the sea water being evaporated by condensing steam. Initially, primary steam is introduced through the a pipe 11 to the first stage $FSt_1$ which forms the first vertical tube evaporation (VTE) process stage and, at the same time, the primary steam serves to heat the uppermost stage $PHSt_1$ of the preheater PH. The preheated sea water passes over an overflow 12 into the inlet of the first stage $FSt_1$ of the falling film evaporator FV and as it flows downwardly through the successive stages the sea water is divided into a liquid component and a steam component. The liquid component passes into the inlet of the adjacent next lower stage of the falling film evaporator FV and so on until it passes through each of the stages $FSt_1$ to $FSt_n$. The steam generated within the first VTE stage and the steam developed from flashing the condensate passing downwardly from the first stage of the multiple stage flash (MSF) evaporator is used in heating the second stage $FSt_2$ of the falling film evaporator. The steam component is also used to heat the corresponding stages $PHSt_2$ to $PHSt_n$ of the preheater. In the vertical columns formed by the falling film evaporator and the preheater the stages of each are generally paired as shown in FIG. 1 so that the process, to be described in greater detail below, is repeated in each stage. The steam remaining in the final stage $PHSt_n$ is condensed and is evacuated together with the remaining fresh water distillate passing downwardly through the MSF stages by the pump 23. After the salt water concentrate or brine flows through all of the VTE stages, it is possible, while the fresh water is removed by the pump 23, that the sea water concentrate is collected below the final stage $FSt_n$ at the collector 25 and is carried off through the pump 24. Each of the interconnections between the VTE stages and the preheater (UW) stages forms at least one MSF stage.

The sea water falling film evaporator FV is made up of a multiplicity of identical pairwise-joined heat exchanger plates 30 which will now be described with reference to FIGS. 3–6.

Figure 6:
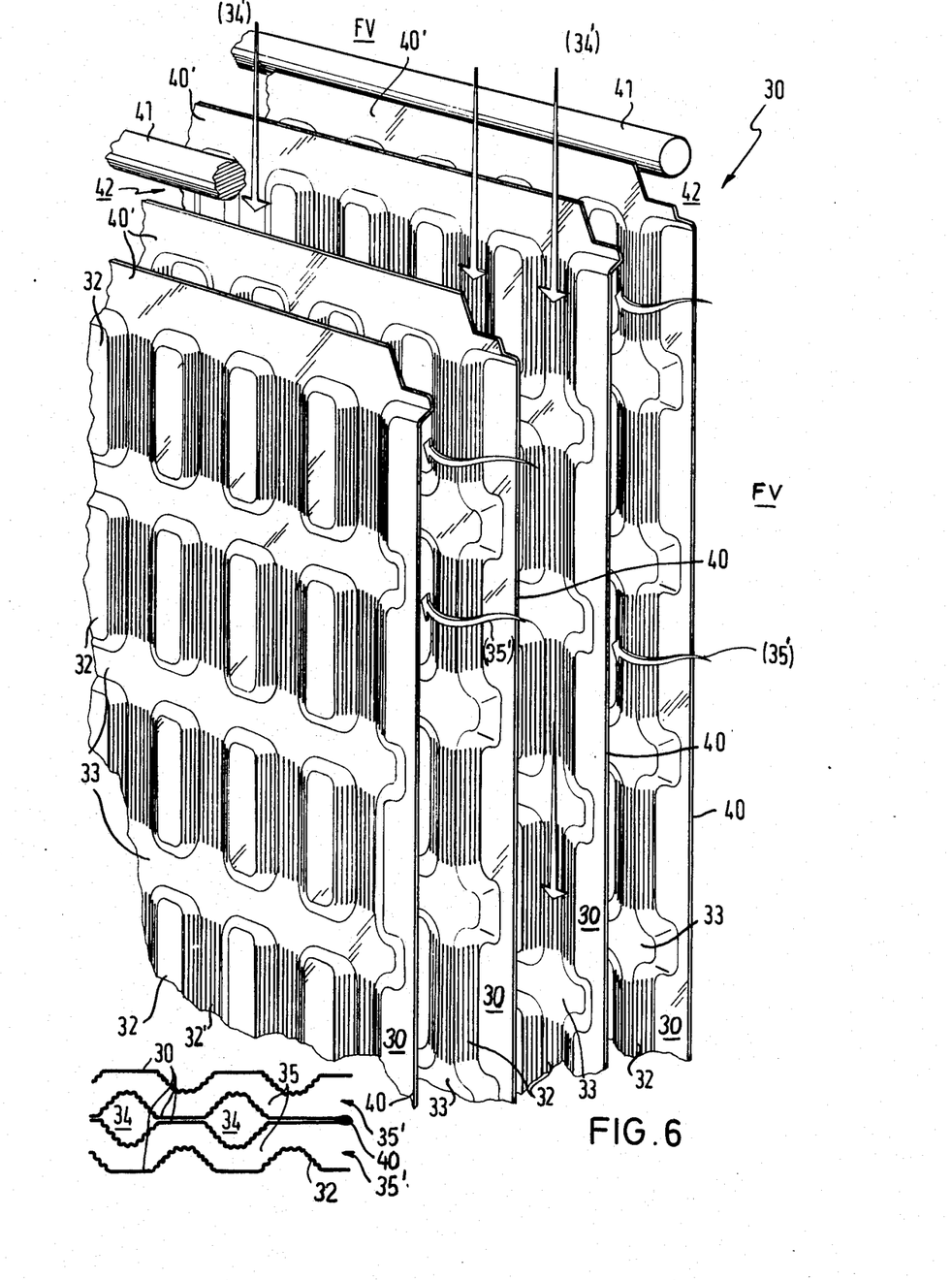
FIG. 6 is a partial perspective view of one stage of the falling film evaporator shown in FIG. 3, however, on a much larger scale.

Each heat exchanger plate 30 is a rectangular stamped sheet with a grid-like arrangement of reinforcing projections 32, 33 formed in the longitudinal and transverse directions of the plate, note FIG. 6. While the projections 32, 33 extend from opposite sides of the plate, these projections on one side df the plate form corresponding recesses or depressions in the opposite side. Grooves 32' are provided between adjacent long sides of the projections 32. The heat exchanger plate are stacked alongside one another in pairs so that the projections in one plate extend in a line offset from the projections in the other plate and the plates are welded together along the side edges 40', note FIG. 6, that is the edges extending parallel with the shorter sides of the projections. Accordingly, this pair of plates defines a number of slot-like ducts 35 extending between the projections 33. If two such plate pairs are stacked one against the other with the projections 32 in opposite alignment, that is in a mirrorsymmetrical manner, tubular ducts are formed between the contacting projections of each adjacent pair of plates. Note the arrangement of the plates in FIG. 6. Accordingly, in one direction a plurality of juxtaposed tubular ducts 34 extend at right angles to a plurality of juxtaposed slot-like ducts 35, so that the heat exchanging media pass in cross-flow to one another. As viewed in FIG. 6 the tubular ducts 34 extend vertically while the slot-like ducts extend horizontally. The adjacent edges 40' of the two plate pairs, note the upper end in FIG. 6, define slots 42 extending across the plates transversely of the longer dimension of the projections 32. In the case of the falling film evaporator the slots 42 are located at the inlet and outlet ends of the downwardly flowing sea water. In each of these slots at the inlet side, a rod 41 is placed so that it extends across the full length of the inlet. The rods 41 act as distributors and also as weir-like members for the sea water passing downwardly from one stage of the falling film evaporator to the next downwardly located stage. As a result, steam pressure between the individual tubular ducts of the adjacent stages and the differences in the salt concentration of the sea water are compensated. In each instance, the slots are disposed opposite the outlet end of the adjacent upwardly located stage of the falling film evaporator. The stacked heat exchanger plate pairs are held in position by side walls 205, 206 of the container, note FIG. 3. Thus, the tubular ducts 34 formed by the adjacent pairs of heat exchanger plates 30 and extending in the longer direction of the projections 32 form the evaporation surface for the sea water flowing through each stage of the falling film evaporator, while on the slot side formed between the other plates, the steam required to evaporate the sea water flows. The projections 33 of the heat exchanger plates form cross connections for the sea water flowing through the tubular ducts 34. The liquid component-steam component mixture leaving an individual stage of the tubular ducts 34, as a result of the cross connection formed by the projections 33, is distributed uniformly into the tubular ducts in the following stage so that the pressure within the individual tubular ducts as well as the differences in the salt concentration entering the ducts is compensated before the flow commences downwardly through each stage due to the distributing effect of the rods 41.

Figure 2:
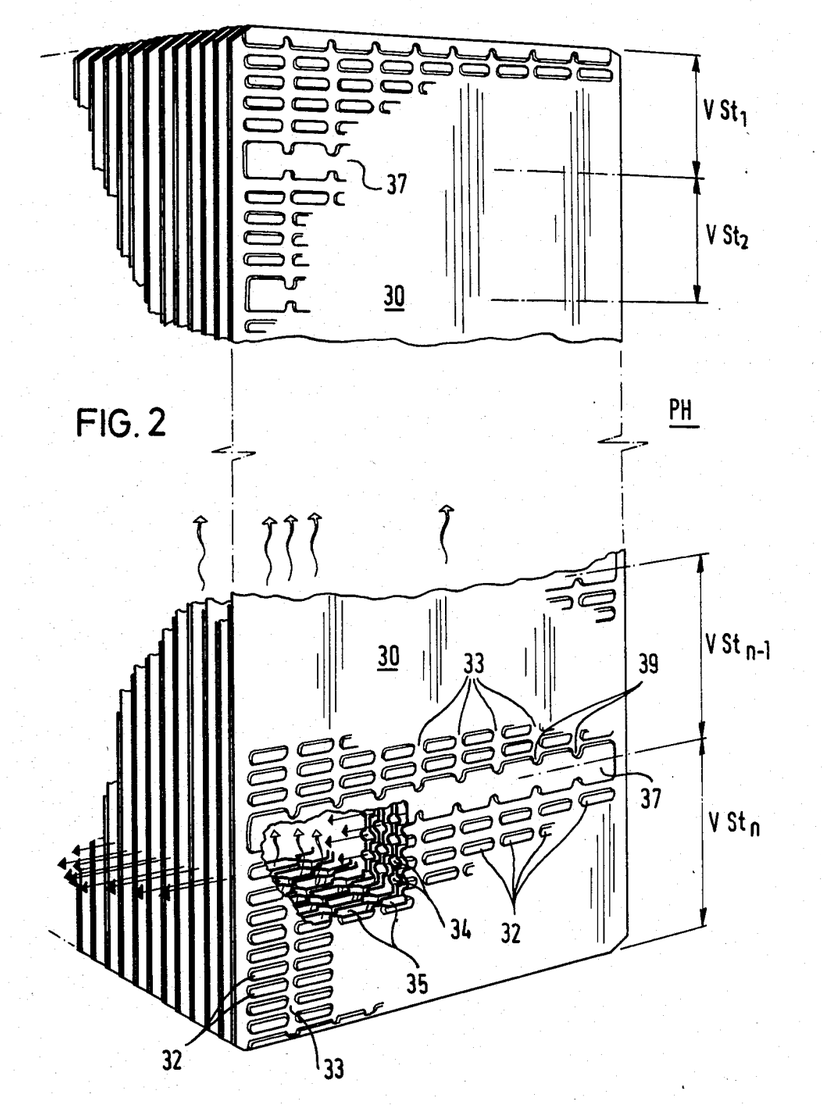
FIG. 2 is a perspective view of a part of the sea water preheater as shown in FIG. 1.

The sea water preheater PH, shown in part in FIG. 2, is constructed of the same heat exchanger plates 30 combined in the same manner of pairs of plates. In the preheater PH, as compared to the falling film evaporator FV, the orientation of the projections 32 and 33 are rotated through 90° that the tubular ducts 34 extend horizontally while the slot-like ducts extend vertically.

Figure 4:
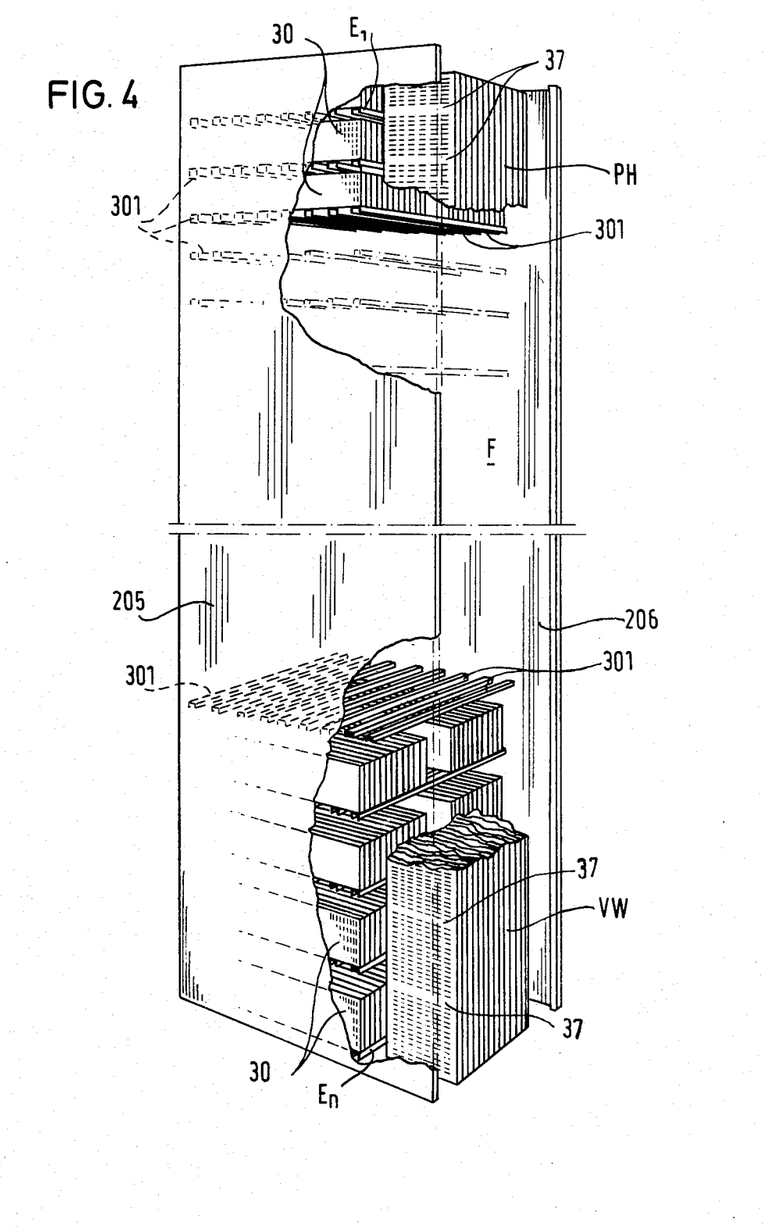
FIG. 4 is perspective diagrammatic view of a portion of the falling film evaporator and preheater of the present invention illustrating the first and last stages of the apparatus.

As illustrated in FIG. 4, the sea water preheater PH extends for the full vertical height of the column defined by the multi-effect unit and is subdivided by transversely extending unstamped areas 37 within the individual heat exchanger plates 30 into a number of sections corresponding to the desired number of preheater stages. This subdivision of the preheater, while determining the pressure of the sea water flowing upwardly through the slot-like ducts, forms a separation between the individual stages of the preheater containing the tubular ducts 34. Because of the unstamped areas 37, the surfaces of the plates are placed against one another and define the separation between adjacent preheater stages. As a consequence, the number of tubular ducts 34 in each stage of the preheater is determined by the spacing between the adjacent unstamped areas.

The arrangement of the unstamped areas 37 is, in each case, determined in accordance with the pressure and temperature stages of the multi-effect column selected for the evaporation process as a function of the temperature difference. In the illustrated embodiment, 55 stages are provided between the inlet stage and the outlet stage, and the distance between two adjacent unstamped areas 37 is smaller, stage to stage, from the inlet to the outlet, note FIG. 4, and, as already indicated, the number of tubular ducts 34 varies from stage to stage, decreasing toward the upper outlet end of the preheater.

The width of the slot-like ducts 35 is determined by the spacing between the projections 33 stamped in the plates, that is, when the pairs of exchanger plates are stacked alongside one another so that there is a plurality of separated slots in the pairs of plates forming the slot side of the heat exchanger. If the stamping operation forming the projections is not carried out at a particular location, such as location 39 in FIG. 3, there is a bypass formed between adjacent slot-like ducts 35.

The cold sea water is introduced into the slot side of the first bottom stage of the preheater and passes upwardly until it reaches the final top stage. While the sea water to be preheated passes vetically upwardly the heating steam is passed in a stagewise manner as right angles through the tubular ducts formed in each of the individual preheater stages. In the final uppermost stages of the preheater, only hot primary steam is passed through the tubular ducts while in all of the remaining stages a secondary steam flows through the tubular ducts, that is, a steam mixture provided by the combination of the primary steam and the steam generated in the stages of the falling film evaporator which will be described later. Accordingly, the lowest steam temperature flows through the inlet stage of the preheater corresonding to the lowest temperature of the sea water entering the initial preheater stage.

Figure 3:
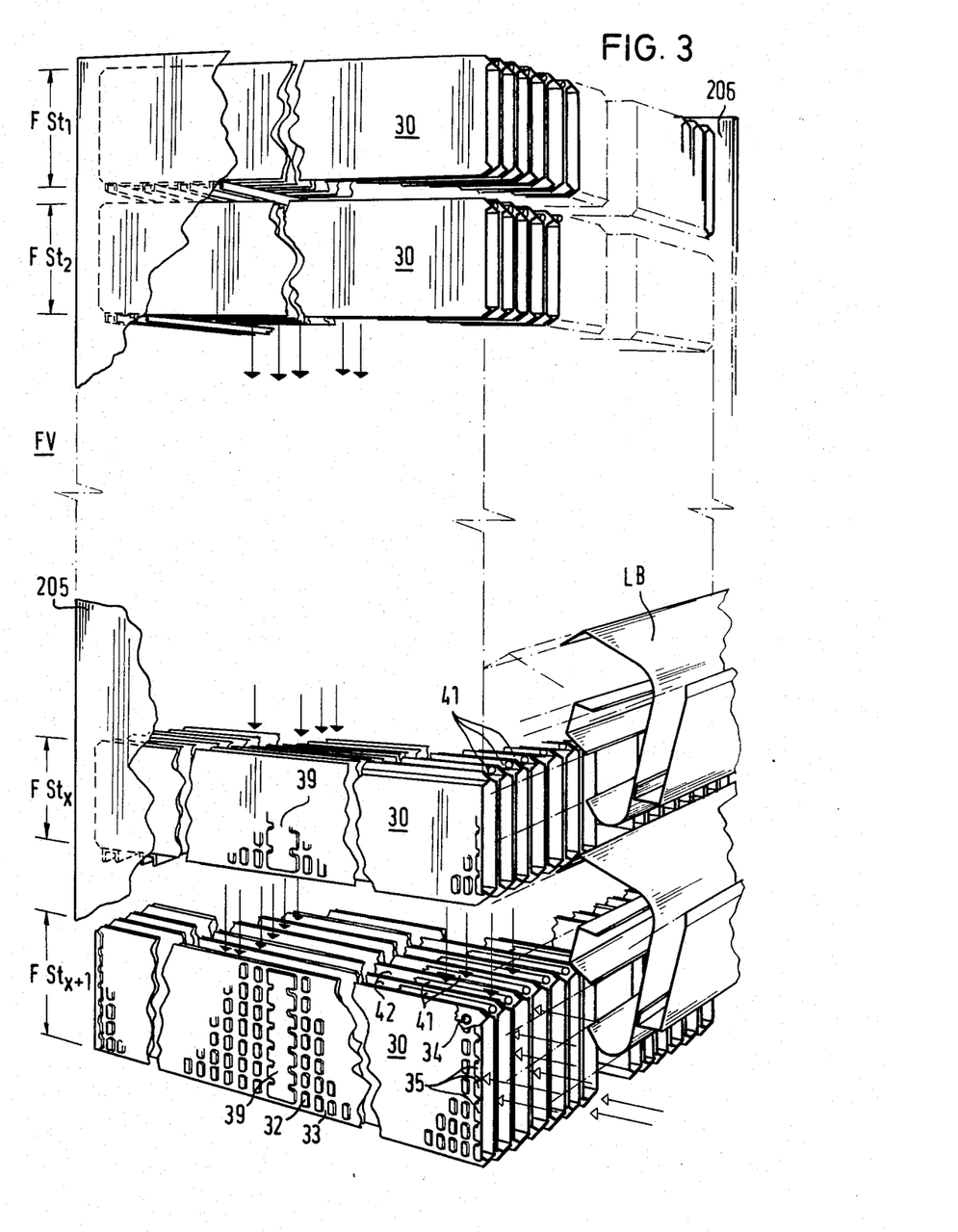
FIG. 3 is a perspective view of a portion of the falling film evaporator as shown schematically in FIG. 1.

In FIGS. 3 and 4 the stagewise arrangement of the heat arrangement of the heat exchanger plate pairs with the falling film evaportor FV is illustrated. While the vertically arranged sea water preheater PH extends over th full height of the multi-effect column as an assembly subdivided into stages by the unstamped areas 37, falling film evaporator FV is subdivided into individual assemblies of sections corresponding to the number of stages of the column extending in a number of planes $E_1$ to $E_n$. The number of planes $E_1$ to $E_n$ correspond to the number of preheater stages so that for each plne with the desired pressure and temperature stages $St_1$ $St_n$ for the multi-effect evaporation process there is a corresponding stage of the falling film evaporator and of the preheater. Further, for each combined falling film evaporator-preheater stage there is at least one separated MSF evaporator stage 312, note FIG. 1.

For the subdivision of the container BE into the individual stages a frame construction is provided within the container made up of the fixed side walls 205, 206 and the movable side walls 207, 208. The individual levels of the stages of the falling film evaporator are formed by the shaped members 301 extending transversely between the fixed side walls 205, 206. The spacing between the individual stages of the preheater is determined by the individual shaped members 309 mounted on the movable side wall 208. Accordingly, the number of planes $E_1$ to $E_n$ have a spacing determined by the spacing between the individual frame members. On each level of the shaped members 301, a group of the heat exchanger plates 30 are arranged forming a stage of the falling film evaporator. Each stage of the falling film evaporator has a corresponding stage in the preheater. As shown in FIG. 3, deflectors or baffles LB are provided in each combined stage for affording flash evaporation so that steam, the sea water liquid component or brine and fresh water is supplied to each of the individual combined stages. Similarly, with regard to the diagrammatically represented suction system, note FIG. 1, the non-condensable inert gas produced in the condensation zone in each stage of the falling film evaporator, can be removed. In each stage of the falling film evaporator, the condensation zone is formed by an unstamped area 39 of the heat exchanger plates 30 of the falling film evaporator, that is, the center of the plates extending in the direction from the deflectors LB to the opposite side wall 207, note FIG. 3. This unstamped area 39 interconnects all of the slot-side ducts 35 of the assembled pairs of plates in the stage. Therefore, the inert gas components can be removed at the bottom slot of the heat exchanger plate pairs for each stage of the falling film evaporator.

As has already been mentioned, the steam pressure within the individual tubular ducts 34 of the falling film evaporator is compensated by the rods 41 extending across the inlet ends of the plates forming the tubular ducts 34. Similarly, in addition to balancing the pressure the rods also provide a balancing effect of the salt concentration of the liquid component of the sea water flowing downwardly through the tubular ducts. The rods 41 correspond to the length of the inlets into each stage of the falling film evaporator and the rods are located within slots 42. The slots 42 are formed by the unstamped ends of the plates, note FIG. 3, which unstamped ends are welded together by means of a roll seam weld joining two heat exchanger plates 30 so that the adjoining plates of the pairs of plates joined together by such weld form the slots 42 and also form between them the tubular ducts 34. The rods 41 provide a weir-like arrangement for the downwardly flowing liquid component of the sea water exiting from the outlet of the adjacent upwardly located VTE stage.

All of the sea water preheater PH and VTE and MSF evaporator stages supported by the frame construction are laterally enclosed by a pressure-tight container BE shown in part and, in turn, held by a support structure. The evaporator stages are connected to the vacuum system.

In the embodiment illustrated in the drawings, particularly in FIG. 1, the combined multi-effect evaporation process for sea water desalination using the stamped heat exchanger plates 30 are divided into 55 process stages for the sea water preheater PH and for the falling film evaporator FV forming the VTE process. In addition, 91 MSF stages, defined by the deflectors LB, note FIG. 3, extending across the width of each stage are located between each of the individual VTE stages. A single MSF stage is provided for each of the first 43 VTE stages, while 4 MSF stages are provided for each of the last 12 VTE stages, note in particular FIGS. 1 and 5.

In the first 43 VTE process stages of the falling film evaporator FV, that is starting from the upper end of the falling film evaporator, deflectors LB are provided for each stage. For each stage, other deflectors 306 and 310 are provided on the side of the stage remote from the preheater PH and adjacent the slidable wall 207. The deflectors LB are formed b deflectors, 304, 305 and 308 are located on the opposite side of each stage adjacent to the sea water preheater PH. Deflectors 306 and 310 are constructed as centrifugal drip separators and are curved in the form of an open ellipse, while deflectors 304 are curved in the manner of an angle with a short side and a long side. Accordingly, the combination of the walls of the deflectors 305 and the deflectors 304 define U-shaped ducts 312 in which condensed fresh water is collected from the preceding VTE stage. A series of holes 313 are provided in the bottom of the ducts 312 so that the condensed fresh water can flow downwardly from the U-shaped ducts into the next subjacent MSF stage where at least some of the fresh water is flashed into steam. As can be seen in FIG. 1, for each of the bottom 12 VTE stages there are four deflectors 305 for each deflector 304, that is, corresponding to the stages $FSt_{44}$ to $FSt_{55}$ in FIGS. 1, so that four MSF process stages are associated with each of these VTE process stages.

Figure 5:
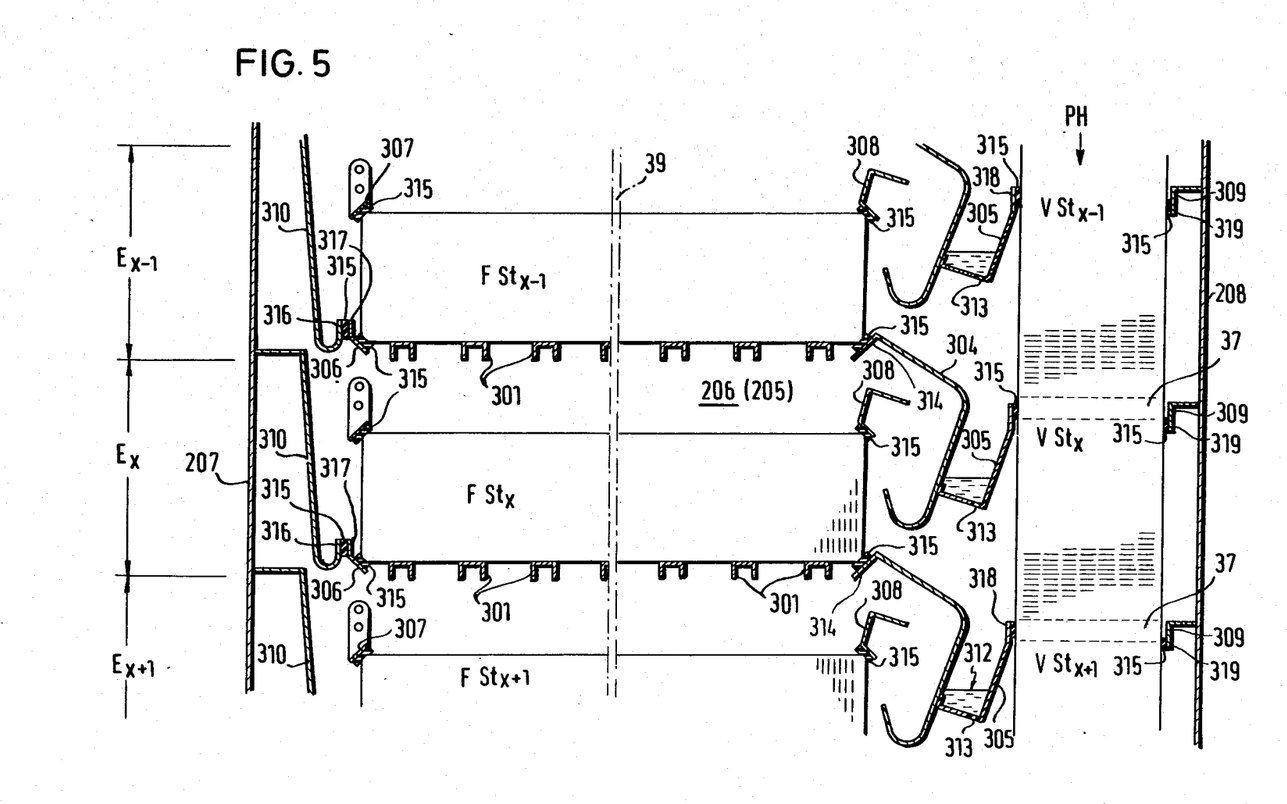
FIG. 5 is a sectional view on an enlarged scale showing a portion of the falling film evaporator and the preheater illustrated in FIG. 4 illustrating two VTE process stages and one or more MSF stages.

The upper ends 314 of the deflectors 304 as well as the deflectors 306, 307 and 308 form sealing surfaces for the individual falling film evaporator stages FSt and the heat exchanger plates forming each of the stages are constructed as slide-in units. To ensure reliable sealing, silicone seals 315 are associated with each of these sealing members. Further, as can be seen in FIG. 5, the angular deflectors 310, fixed to the movable container wall 207, are engaged at their lower U-shaped ends 316 through a sealing member 315 to a part 317 of the deflector 306. An additional sealing member 315 is also provided between the deflector 306 and the heat exchanger plates. The deflectors secured in a fixed manner between the fixed side walls 205 and 206 form tie rods for the fixed container walls, particularly in the region of the container BE where the preheater is located. The deflectors 305 with their end parts forming the sealing surfaces 318 also have interposed sealing members 315 which engage on the facing surfaces of the corresponding stages VSt of the preheater PH and, in particular, at the locations where the unstamped areas 37 subdivide the preheater into its individual stages. Further, deflectors 309 are provided between the movable side wall 208 of the container BE and the adjacent sides of the preheater PH. Seal members 315 are provided between the sealing surfaces formed by the portions 319 of the deflectors 309 and the adjacent preheater.

Therefore, by means of the deflectors 304 to 310, the individual stages of the multi-effect apparatus are interconnected in a pressure-tight manner. The steam generated by each stage of the VTE/MSF evaporator can flow to the associated stage of the preheater where it serves to heat the upwardly flowing sea water.

In the embodiment illustrated in the drawings, the individual reinforcing projections 32 of each heat exchanger plate 30 has a length or long dimension of 35 mm, and the tubular ducts 34 of the sea water preheater have a length of 350 mm., The slot-like ducts of the falling film evaporator have a long dimension extending transversely of the column of 2160 mm, and the individual stack of plates forming a falling film evaporator sliding unit or stage have a thickness of 500 mm and the overall column has a height of 34000 mm.

The apparatus, as described above, functions in the following manner. As indicated above, all of VTE and MSF process stages, with the exception of the final condenser are housed in the pressure-tight container BE. The various pressure chambers are defined directly by the individual stages of the falling film evaporator and the connected deflectors or baffles LB of the MSF stages. Preheater PH is vertically incorporated into the container and its heating surfaces are connected directly with the individual steam chambers of the VTE and MSF stages.

In the initial VTE process stage $FSt_1$ of the falling film evaporator FV, the sea water heated in the preheater PH to 130° C. is evaporated at 130° C. by means of the primary steam introduced through the line 11. The primary steam condensed within the first VTE stage is supplied by means of the first MSF stage and with the condensed fresh water or distillate component produced in the process passes through all of the 91 MSF stages and exits from the container along with the condensed fresh water obtained from the sea water, at a temperature of approximately 28.9° C.

After flowing through the first stage, the liquid component of the sea water or brine is held at the inlet of the next VTE stage by the rod or weir-like distributor 41 which forms a seal-like member between the adjacent stages and also provides a distributing effect for introducing the liquid component of the sea water into the next VTE stage of the falling film evaporator. As a result of the rod 41, there is an overflow of a small amount of the liquid component or brine which is introduced directly into the next MSF stage which is at a lower pressure and flash evaporation occurs. The main volume of the liquid component of the sea water passes into the next subjacent VTE stage. Through the pressure reduction and the heat transfer from the condensing fresh water steam of the preceding stage, a portion of the liquid volume flowing downwardly to the tube ducts evaporates in each stage of the falling film evaporator heat exchanger. After passing out of each stage of the falling film evaporator, the evaporated sea water or steam and the liquid component of the sea water are separated. The remaining liquid component or brine follows the same process in each of the following VTE stages each time at modified saturated steam temperatures and pressures.

The distillate or steam is passed by the deflectors 304 which also act as centrifugal drip separators, to the condensation surfaces of the next following stage where the steam is condensed in the falling film evaporators of the VTE stage and also on the heat exchanger surfaces of the preheater. The resulting condensed fresh water is collected by the deflectors 305 ducts 312, note FIG. 5, and passes through the restrictors or holes 313, to the next lower pressure level where again at least a part of the condensed fresh water is flash evaporated.

In the upper 43 stages, the flash evaporated steam is directly mixed and condensed with the steam component of the particular VTE stage in the manner described above. In the lower 12 stages, however, the fresh water condensate is not flash evaporated in one stage, rather the pressure difference of the particular VTE process stage is subdivided into a plurality of flash stages, for example, four such stages. The steam produced by these MSF stages is condensed only on the tube-side heat exchanger surfaces of the preheater PH.

The salt water collecting in the centrifugal separators is supplied again to the following stage through restrictors based on the pressure differences.

The inert gases obtained during each flash evporation and condensation are drawn out of each stage at the points, suction takes place at the end points of the condensation process. The inert gases obtained in the VTE stages are removed by suction through a cavity 400 located between the deflectors and the movable side wall 207 of container BE and also at the lowermost slot cross-section 410 of the falling film evaporator, located at the center or unstamped area 39 of each heat exchanger plates surface. The inert gases obtained during the condensation process in the preheater are removed by connections 403 at the other movable side wall 208 of the container BE via a cavity 404 between the preheater and the side wall at the condensation end point. The inert gas suction capacity for the individual stages is controlled by throttle valves 405 in connecting lines 406.

The described combination of VTE and MSF stages leads to numerous advantages which provide for the production of fresh water in a multi-effect procedure which has not been considered possible in the past. The particular contribution to this multieffect procedure is afforded by the use of the known plate-type heat exchanger. For example, it is immediately apparent that, as a result of the limited free "tube length" of only 35 mm for the individual falling film evaporator elements of the stages, as provided by the stamped projections 32, a film is maintained over the entire length of the tubular ducts 34 which, as mentioned above, is not possible in falling film tubular evaporators where the tube length is up to 7 m. The use of the described heat exchanger elements also makes it more possible, than has been the case in the past, to subdivide the available temperature and pressure range into a random number of individiual stages and this characteristic or feature has a very favorable influence on the efficiency of the multi-effect column.

While specific embodiments of the invention have been shown and described in detail to illustrate the application of the inventive principles, it will be understood that the invention may be embodied otherwise without departing from such principles.

I claim:

1. Process for the distillation of fresh water from sea water by film evaporation in a multiple stage vertical tube evaporator (VTE) process where the stages are arranged vertically one below the other with the uppermost stage forming the first VTE process stage and the lowermost stage forming the last VTE process stage with each stage containing a vertical tube evaporator and with the sea water being passed generally vertically downwardly through each VTE stage which has an upper inlet and a lower outlet spaced apart in the vertical direction and each of the stages extending two dimensionally transversely of the vertical direction, comprising the steps of passing sea water unwardly through a multi-stage preheater laterally coextensive with the multiple stage vertical tube evaoorator from a lowermost stage to an uppermost stage, passing the sea water from the uppermost stage of the preheater into and downwardly through the first VTE process stage from the inlet to the outlet and heating the sea water for forming a liquid component and a steam component of the sea water, collecting the liquid component and the steam component from the outlet of the first VTE stage and distributing the liquid component of the sea water transversely across the inlet of the next lower VTE stage for flow downwardly therethrough and conveving the steam component from the first VTE stage into at least one stage of a multiple stage flash (MSF) evaporator located laterally alongside the first VTE stage where the stages of the multiple stage flash (MSF) evaporator are arranged one below the other laterally alongside the vertical tube evaporator and including an uppermost stage and a lowermost stage and condensing the steam component and forming fresh water, collecting fresh water condensed from the steam component conveyed into the at least one MSF stage, passing the condensed fresh water downwardly to the next lower MSF stage and flashing at least some of the condensed fresh water in the next lower MSF stage, circulating the steam component from the next lower MSF stage through the next lower VTE stage, continuing the downward flow of the liquid and steam components, in turn, through the remaining VTE and MSF stages, removing the concentrated liquid component of the sea water from the final VTE stage and removing the condensed fresh water from the final MSF stage, providing a preheating stage in communication with each said MSF stage and circulating the steam component from the MSF stage into the communicating preheating stage for preheating the sea water flowing upwardly therethrough, collecting inert gases separating from the steam in each component combined stage of the VTE and MSF stages and each stage of the preheating stages, and removing the collected inert gases by suction from each combined stage of the VTE and MSF stages and from each of the preheating stages.

2. Process, as set forth in claim 1, including the step of providing a plurality of MSF stages for each VTE stage commencing with the final VTE stages and extending for a portion of the VTE stages in the upward direction of the vertical tube evaporator.

3. Process, as det forth in claim 2, comprising arranging 55 VTE stages following one another in a downward flow direction and 91 MSF stages extending downwardly in the flow direction throuch the VTE stages, and arranging a single MSF stage for each of the first 43 VTE stages and providing four MSF stages for each of the final VTE stages.

4. Process, as set forth in claim 1, comprising arranging the VTE, the MSF, and the preheating stages in generally horizontally arranged aligned flow communiction so that one VTE stage and one preheater stage are in flow communication with at least one MSF stage and maintaining the steam temperature and steam pressures in each of the intercommunicating stages at approximately the same level.

5. Process, as set forth in claim 1, including passing the sea water to be preheated upwardly through slot-like ducts extending continuously from the lowermost to the uppermost end of the preheater and flowing the steam component in indirect heat transfer relation in the direction extending transversely to the upward flow through individual stages of the preheater; flowing the liquid component of th sea water downwardly through tubular ducts in the individual VTE stages and flowing the heating steam component transversely of the downwardly flowing liquid component sea water thourgh each of the VTE stages.

* * * * *